Sept. 14, 1926.  1,599,588
F. A. PUTNAM
CONVERTIBLE SEAT, BERTH, AND TABLE FOR AUTOMOBILES AND LIKE VEHICLES
Filed Oct. 30, 1922  3 Sheets-Sheet 1

Inventor.
Fred A. Putnam
by Heard Smith & Tennant
Attys

Sept. 14, 1926.
F. A. PUTNAM
1,599,588
CONVERTIBLE SEAT, BERTH, AND TABLE FOR AUTOMOBILES AND LIKE VEHICLES
Filed Oct. 30, 1922
3 Sheets-Sheet 2
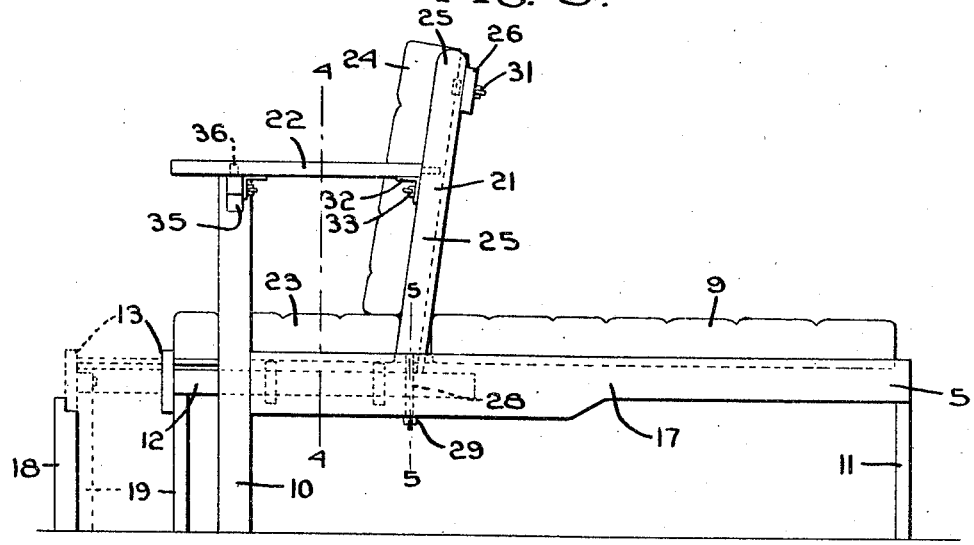
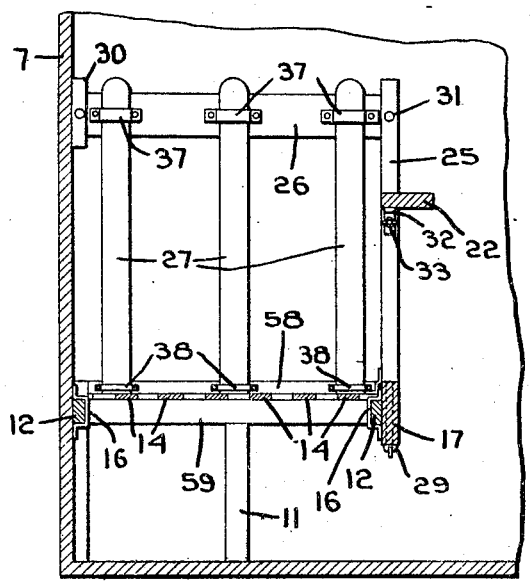
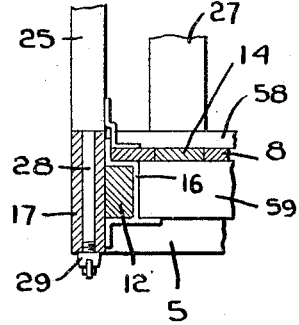
Inventor.
Fred A. Putnam
by Heard Smith & Tennant
Attys Sept. 14, 1926.  
F. A. PUTNAM  
1,599,588  
CONVERTIBLE SEAT, BERTH, AND TABLE FOR AUTOMOBILES AND LIKE VEHICLES  
Filed Oct. 30, 1922  3 Sheets-Sheet 3

Inventor.  
Fred A. Putnam  
by Heard Smith & Tennant.  
Attys

Patented Sept. 14, 1926.

1,599,588

UNITED STATES PATENT OFFICE.

FRED A. PUTNAM, OF KEENE, NEW HAMPSHIRE.

CONVERTIBLE SEAT, BERTH, AND TABLE FOR AUTOMOBILES AND LIKE VEHICLES.

Application filed October 30, 1922. Serial No. 597,764.

This invention has for its object to provide a novel convertible seat, table and berth which is specially adapted for use in automobiles or like vehicles. The invention is of special value in connection with motor camping outfits because with an automobile equipped with my invention it is possible to convert it into a seat for use when touring, or to convert it into a table adapted for use as a dining table or as a table for any other purpose or to convert it into a berth when camping for the night.

The convertible seat, berth and table comprises a fixed frame section which forms part of either the seat or the bed bottom, an extensible frame section having telescopic relation with the fixed section and which in one position forms part of the seat and in another position forms with the fixed section the complete bed bottom, a removable seat back and arm which when in position serves as the back and arm of the seat but which can be removed when the combined seat, table and berth is converted into either a table or berth, and a table top arranged to be removably sustained above the fixed frame section when the seat back is removed and by means of which the device is converted into a table.

In order to give an understanding of the invention I have illustrated in the drawings a selected embodiment thereof which will now be described after which the novel features will be pointed out in the appended claims.

Fig. 3 is a side view of the device arranged as a seat.

Fig. 4 is a section on the line 4—4, Fig. 3.

Fig. 5 is an enlarged section on the line 5—5, Fig. 3.

I have herein illustrated my invention as it might be embodied in an automobile but I desire to state that the invention is not confined in its use to automobiles but is capable of being used in cars and other vehicles.

Figure 1:
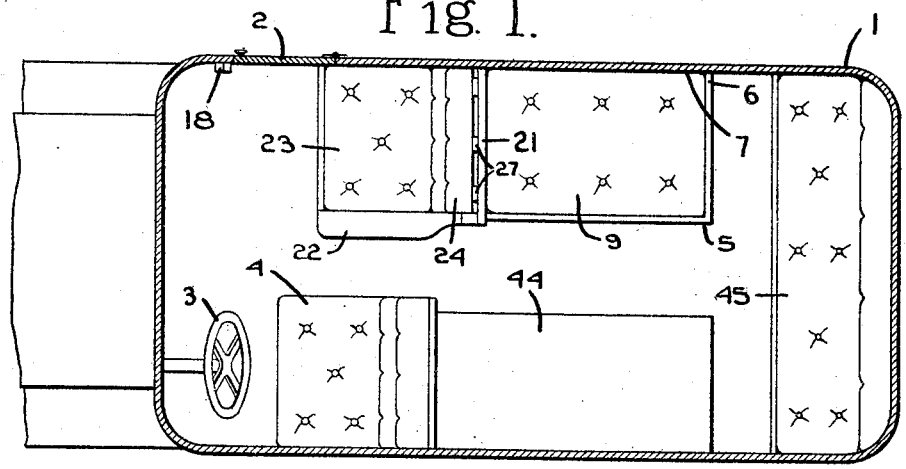
Fig. 1 is a sectional plan view through an automobile body having my improvements applied thereto.

In Fig. 1, 1 indicates an automobile body of the closed type, the latter having a door 2 through which passengers may enter or leave the automobile. 3 indicates the steering wheel of the automobile and 4 a seat arranged for the operator and which may be of any suitable type. In the automobile shown in the drawings my improved convertible seat, berth and table is situated on the opposite side of the automobile from the driver's seat but it is thus shown only for illustrative purposes as the invention will not be departed from if this combined seat, berth and table is placed in any desired position in the automobile body.

My improved combined berth, seat and table comprises a fixed frame section 5, which is secured at one edge 6 to the wall 7 of the automobile body and which is herein shown as provided with slats 8 adapted to support a cushion 9. This fixed frame section 5 is supported partially at its outer edge either by the wall 7 or by legs or posts 9 secured to the wall. The inner edge of the frame section 5 is supported at one corner by a fixed post 10 which extends above the frame and functions also as a support for the table top to be hereinafter referred to, and as a support for the arm of the chair or seat. I have shown a further support 11 for the fixed section 5 and which is in the form of a leg permanently secured in place.

Figure 2:
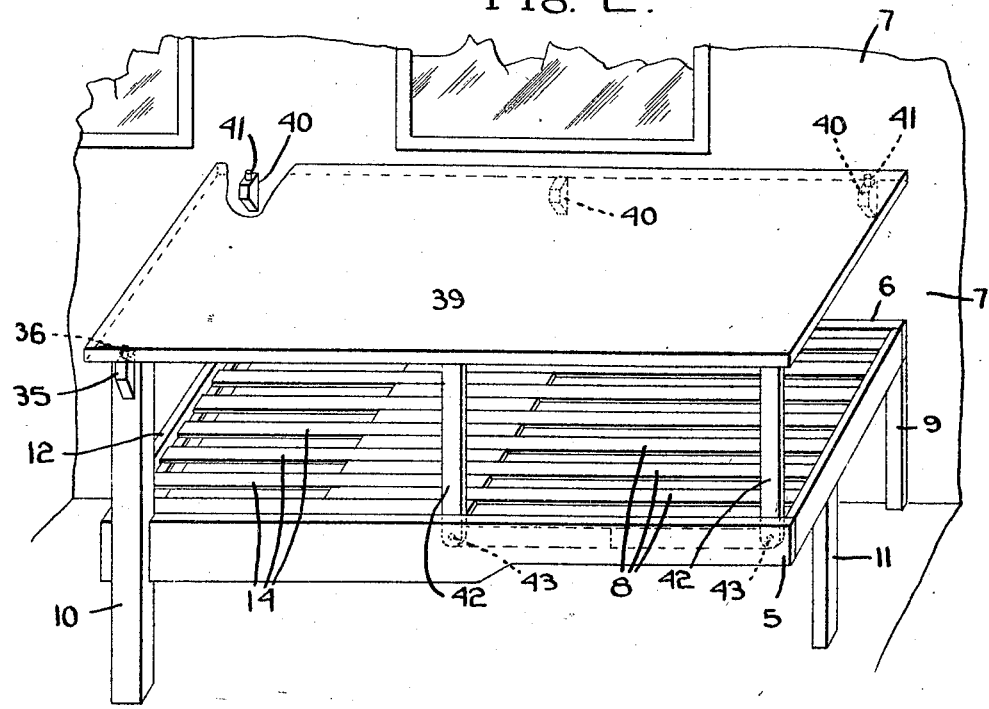
Fig. 2 is a perspective view of the convertible seat, berth and table arranged as a table.
Figure 6:
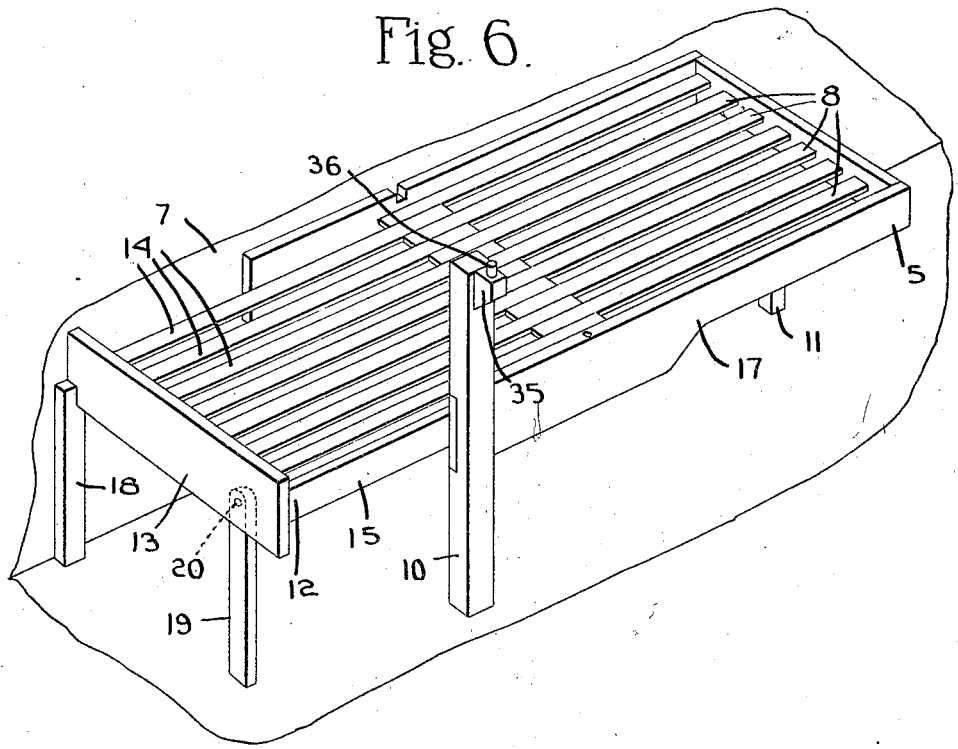
Fig. 6 is a perspective view showing the device arranged for a berth but with the cushions removed.
Figure 7:
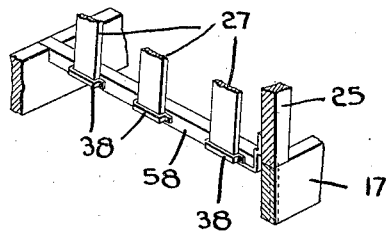
Fig. 7 is a fragmentary detail of the seat.

Associated with the fixed section 5 is an extensible section 12 which has a telescopic relation with the fixed section 5 and can be either telescoped into the folded position shown in Fig. 2 or can be extended into the position shown in dotted lines Fig. 3 and in full lines Fig. 6. This extensible section 12 is shown as having an end piece 13 from which extends slats 14 that fit and slide between the slats 8. This extensible section 13 also has a side rail 15 which slides in suitable guides 16 carried by the inner face of the side rails 17 of the fixed frame section 5. When the extensible section 12 is fully extended as shown in dotted lines Fig. 3 and in full lines Fig. 6 it forms with the fixed section 5 a bed bottom of full length. When it is partially extended as shown in full lines Fig. 3 it forms the bottom of a seat as will be presently described.

For supporting the extensible section 13 when it is fully extended I have shown a fixed post or support 18 secured to the wall 7 of the automobile body and on which one end of the end piece 13 rests and have also shown a folding leg 19 which is hinged to the extensible section as shown at 20 and which when in its depending position constitutes a leg or support for the extensible section. When the extensible section is folded as shown in Fig. 2 this leg 19 may be swung out of the way into parallelism with the end piece 13.

The combined seat, berth and table also comprises a seat back 21 and an arm 22 for the seat. The seat back 21 may be constructed in any suitable way without departing from the invention and it is adapted to be removably secured to the fixed frame section 5 near the end thereof which is supported by the post 10 as shown in Fig. 3. The arm 22 is removably secured at its rear end to the back 21 and rests on the top of the post 10 to which it is detachably secured. When the device is converted into a seat, the seat back 21 and the arm 22 are placed in position and, if desired, the extensible section 12 may be extended sufficiently to form a seat of the desired width.

Cushions 23 and 24 for the seat may be employed, the cushion 23 resting on the frame sections and the cushion 24 serving as the back cushion. When the device is thus adjusted it provides one seat with a back and arm facing forwardly and a long seat like a bench or side seat in the rear of the back 21 and which is covered by the cushion 9. This is the way the device may be arranged while driving or touring the country.

The cushions 23 and 24 are of such relative sizes that when the extensible section 12 is pulled outwardly into the full line position Fig. 6 to form a bed bottom, said cushions 23 and 24 together with the cushion 9 will cover the extended frame and thus provide a mattress for the berth suitable for sleeping purposes.

The seat back 21 may have any desirable construction and for the sake of illustration it is herein shown as comprising an upright member 25 to which the rear end of the arm 22 is secured, a cross piece 26 secured to the upright at one end and adapted to be detachably secured to the wall 7 at the other end and vertically-extending slats 27 which support the back cushion 24. The upright 25 is shown as having a bolt 28 extending from its lower end which extends through the side rail 17 of the fixed frame section 5 and which has a wing nut 29 screw-threaded to its lower end thereby removably securing said vertical upright member 25 in place. The end of the cross member 26 is shown as supported in a socket 30 secured to the wall 7 and said upright and cross member 26 may be detachably secured together by a bolt 31. The arm 22 is shown as having a bracket 32 secured to its rear end which is detachably secured to the upright 25 by a suitable bolt 33. This arm is also detachably secured to the upper end of the post 10 and for this purpose it is shown as having an angle-iron bracket 34 secured thereto which in turn is detachably secured to said post. The latter is provided with an extension 35 to give greater width at the upper end to support the arm 22 and this extension is shown as having a positioning pin 36 rising therefrom which enters a recess in the arm 22.

The slats 27 are shown as retained in place at their upper ends by means of guiding loops 37 secured to the cross piece 26 and at their lower ends they are shown as set into sockets 38 carried by a cross piece 58 which is removably retained in place.

For converting the device into a table the seat back 21 and arm 22 are removed and a table top 39 is supported above the frame section 5 as seen in Fig. 2. This table top is shown as of a size to extend from the post 10 to the rear of the frame section 5 and one corner of the table top is supported on the post 10 while the edge of the table top adjacent the wall 7 rests on wall brackets 40 secured to the wall 7. These wall brackets are shown as having positioning pins 41 rising therefrom which enter sockets or recesses formed in the under side of the table top and thus hold the table top from horizontal movement. The table top is also provided with a recess to receive the positioning pin 36 on the post 10.

The table top is further supported by one or more folding struts 42 which are herein shown as pivoted to the fixed frame section 5 at 43 and which may be swung into the vertical position shown in Fig. 2 to support the table top.

In the construction illustrated in Fig. 1 this convertible seat, table and berth is situated on one side of the automobile and on the opposite side back of the driver's seat 4 is a bench or seat 44, while extending across the rear of the automobile body is a rear seat 45. When, therefore, the combined seat, berth and table is made up as a table as shown in Fig. 2 the persons using the table may sit on the rear seat 45, on the bench 44 and on the driver's seat 4.

My invention has special advantages when used in an automobile designed for camping purposes because while it provides desirable seating capacity while touring the country, it provides the necessary table for serving meals, and also the necessary sleeping quarters at night.

I claim:

1. A convertible seat and bed comprising a fixed frame section, a longitudinally extensible frame section having a telescopic relation with the fixed section, said sections when extended forming a bed bottom having the width of said sections and the length of the extended sections, a post forming a support for the fixed frame section, a back detachably secured to the fixed frame section transversely of the bed and intermediate the ends of the fixed section and a seat arm secured to the back and detachably secured to the post.

2. A convertible seat and bed comprising a fixed frame section, a post forming a support therefor, an extensible frame section having telescopic relation with the fixed section and extensible in front of said post, said sections when extended forming a bed bottom, a back extending transversely of the bed in the rear of the post and intermediate the ends of said fixed section, said back being detachably secured to the fixed section to permit removal when the device is to be used as a bed, and a seat arm secured to the back and detachably secured to said post to permit its removal with said back.

3. A convertible seat and bed comprising a fixed frame section, an extensible frame section having telescopic relation with the fixed frame section longitudinally of the bed, said sections when extended forming a bed bottom, a post forming a support for the fixed frame section, a back extending transversely of the bed and detachably secured to the fixed frame section thereof intermediate the ends of said section and a seat arm secured to the back and detachably secured to the post whereby a portion of the fixed frame section and the back and arm may be used as a seat or the back and arm may be removed and said sections used as a bed.

In testimony whereof, I have signed my name to this specification.

FRED A. PUTNAM.